United States Patent
Yagi

(10) Patent No.: US 6,725,020 B2
(45) Date of Patent: Apr. 20, 2004

(54) HELMET WITH INCORPORATED COMMUNICATION SYSTEM

(75) Inventor: Miguel Yagi, Hacienda Height, CA (US)

(73) Assignee: Miguel Angel Yagi, West Covina, CA (US)

( * ) Notice: Subject to any disclaimer, the term of this patent is extended or adjusted under 35 U.S.C. 154(b) by 579 days.

(21) Appl. No.: 09/844,601

(22) Filed: Apr. 27, 2001

(65) Prior Publication Data

US 2002/0160723 A1 Oct. 31, 2002

(51) Int. Cl.[7] .................................................. H04B 1/38
(52) U.S. Cl. .................. 455/90.1; 455/11.1; 455/569.1; 455/344; 455/345; 455/351; 455/66.1; 340/7.5
(58) Field of Search ................................ 455/404, 11.1, 455/569.1, 569.2, 575.2, 90.1, 344, 345, 351, 353, 66.1, 74; 340/7.5, 539.1, 539.18, 539.22

(56) References Cited

U.S. PATENT DOCUMENTS

| | | | | |
|---|---|---|---|---|
| 4,357,711 A | * | 11/1982 | Drefko et al. | 455/90.3 |
| 4,584,721 A | * | 4/1986 | Yamamoto | 2/424 |
| 5,142,700 A | * | 8/1992 | Reed | 455/344 |
| 5,266,930 A | * | 11/1993 | Ichikawa et al. | 345/8 |
| 5,546,609 A | * | 8/1996 | Rush, III | 2/413 |
| 6,406,168 B1 | * | 6/2002 | Whiting | 362/473 |
| 2003/0036360 A1 | * | 2/2003 | Russell et al. | 455/66 |
| 2003/0071766 A1 | * | 4/2003 | Hartwell et al. | 345/8 |

* cited by examiner

Primary Examiner—Vivian Chin
Assistant Examiner—Minh D. Dao

(57) ABSTRACT

A helmet with incorporated communication system including a helmet dimensioned for being positioned on a head of a motorcyclist. The helmet has a communications system incorporated therein comprised of a speaker and a microphone. A control panel is secured to a motorcycle. The control panel is in communication with the communications system of the helmet. The control panel includes a radio with a mini-disk player, a cellular telephone, and a navigation system. A sensor is disposed within the helmet. The sensor is capable of sending a distress signal once an impact on the helmet has been sensed.

4 Claims, 2 Drawing Sheets

HELMET WITH INCORPORATED COMMUNICATION SYSTEM

BACKGROUND OF THE INVENTION

The present invention relates to a helmet with incorporated communication system and more particularly pertains to allowing a motorcyclist to safely operate their motorcycle.

The use of combination helmet devices is known in the prior art. More specifically, combination helmet devices heretofore devised and utilized for the purpose of making the operation of a motorcycle safer are known to consist basically of familiar, expected and obvious structural configurations, notwithstanding the myriad of designs encompassed by the crowded prior art that have been developed for the fulfillment of countless objectives and requirements.

By way of example, U.S. Pat. No. 5,678,205 to Gray discloses a head protection helmet and communication system comprised of a battery powered transceiver, microphone, speaker and antenna. U.S. Pat. No. 5,697,099 to Siska, Jr. discloses a helmet with alarm incorporated, capable of signaling a lack of motion of the wearer. U.S. Pat. No. 5,438,702 to Jackson discloses a helmet and communication system comprised of an earpiece, microphone and antenna. U.S. Pat. No. 5,632,048 to Mortell discloses a protective helmet with means to reduce wind noise.

While these devices fulfill their respective, particular objective and requirements, the aforementioned patents do not describe a helmet with incorporated communication system for allowing a motorcyclist to safely operate their motorcycle.

In this respect, the helmet with incorporated communication system according to the present invention substantially departs from the conventional concepts and designs of the prior art, and in doing so provides an apparatus primarily developed for the purpose of allowing a motorcyclist to safely operate their motorcycle.

Therefore, it can be appreciated that there exists a continuing need for a new and improved helmet with incorporated communication system that can be used for allowing a motorcyclist to safely operate their motorcycle. In this regard, the present invention substantially fulfills this need.

SUMMARY OF THE INVENTION

In the view of the foregoing disadvantages inherent in the known types of combination helmet devices now present in the prior art, the present invention provides an improved helmet with incorporated communication system. As such, the general purpose of the present invention, which will be described subsequently in greater detail, is to provide a new and improved helmet with incorporated communication system that has all the advantages of the prior art and none of the disadvantages.

To attain this, the present invention essentially comprises a helmet dimensioned for being positioned on a head of a motorcyclist. The helmet has a communications system incorporated therein comprised of a speaker and a microphone. A control panel is secured to a gasoline tank of a motorcycle. The control panel is in communication with the communications system of the helmet. The control panel can be activated both manually and by voice through the microphone of the helmet. The control panel includes a radio with a mini-disk player, a cellular telephone, and a navigation system. A sensor is disposed within the helmet. The sensor is capable of sending a distress signal once an impact on the helmet has been sensed. The sensor is in communication with the cellular telephone of the control panel whereby once the impact has been sensed, the distress signal is communicated through the cellular telephone.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved helmet with incorporated communication system that has all the advantages of the prior art combination helmet devices and none of the disadvantages.

It is another object of the present invention to provide a new and improved helmet with incorporated communication system that may be easily and efficiently manufactured and marketed.

It is a further object of the present invention to provide a new and improved helmet with incorporated communication system that is of durable and reliable construction.

An even further object of the present invention is to provide a new and improved helmet with incorporated communication system that is susceptible of a low cost of manufacture with regard to both materials and labor, and which accordingly is then susceptible of low prices of sale to the consuming public, thereby making such a helmet with incorporated communication system economically available to the buying public.

Even still another object of the present invention is to provide a new and improved helmet with incorporated communication system for allowing a motorcyclist to safely operate their motorcycle.

Lastly, it is an object of the present invention to provide a new and improved helmet with incorporated communication system including a helmet dimensioned for being positioned on a head of a motorcyclist. The helmet has a communications system incorporated therein comprised of a speaker and a microphone. A control panel is secured to a motorcycle. The control panel is in communication with the communications system of the helmet. The control panel includes a radio with a mini-disk player, a cellular telephone, and a navigation system. A sensor is disposed within the helmet. The sensor is capable of sending a distress signal once an impact on the helmet has been sensed.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

With reference now to the drawings, and in particular, to figures one through four thereof, the preferred embodiment of the new and improved helmet with incorporated communication system embodying the principles and concepts of the present invention and generally designated by the reference number 10 will be described.

Specifically, it will be noted in the various figures that the device relates to a helmet with incorporated communication system for allowing a motorcyclist to safely operate their motorcycle. In its broadest context, the device consists of a helmet, a control panel, and a sensor. Such components are individually configured and correlated with respect to each other so as to attain the desired objective.

Figure 3:
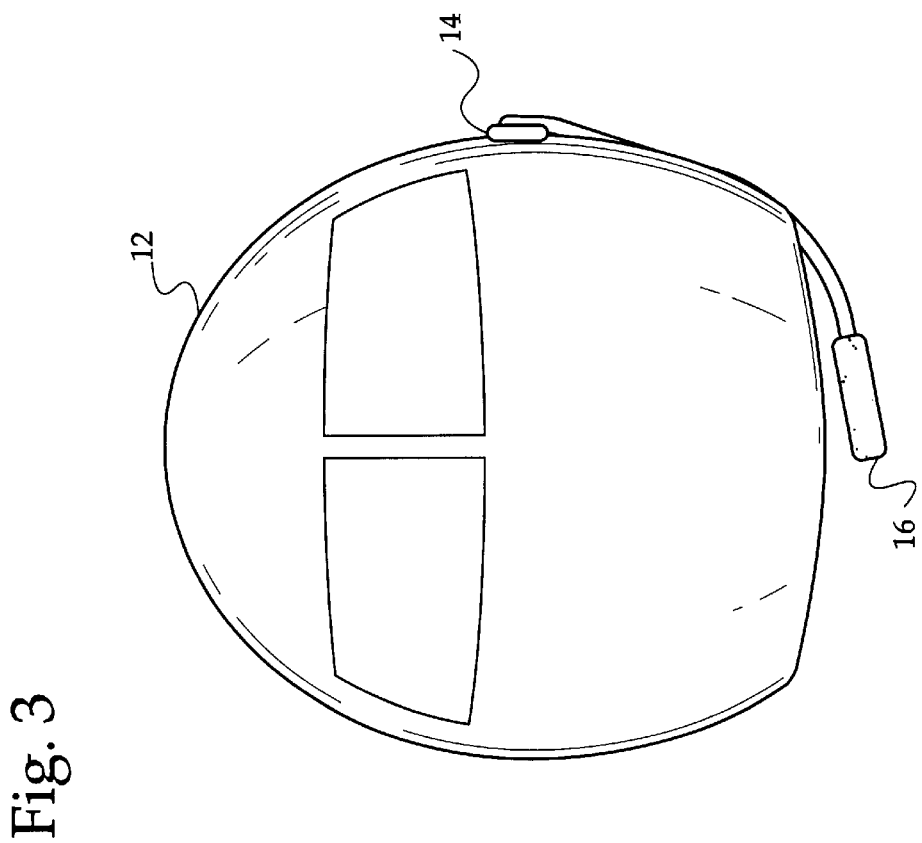
FIG. 3 is a front view of the helmet of the present invention.

The helmet 12 is dimensioned for being positioned on a head of a motorcyclist. The helmet 12 has a communications system incorporated therein comprised of a speaker 14 and a microphone 16. The helmet 12 is similar in construction to helmets utilized in the industry. Note figures one and two. The microphone 16 is shown as external in the drawing figures. However, the microphone 16 may be incorporated within the helmet as well. Additionally, the helmet could be one used in other activities such as bicycling or even scuba diving. Note FIG. 3.

Figure 1:
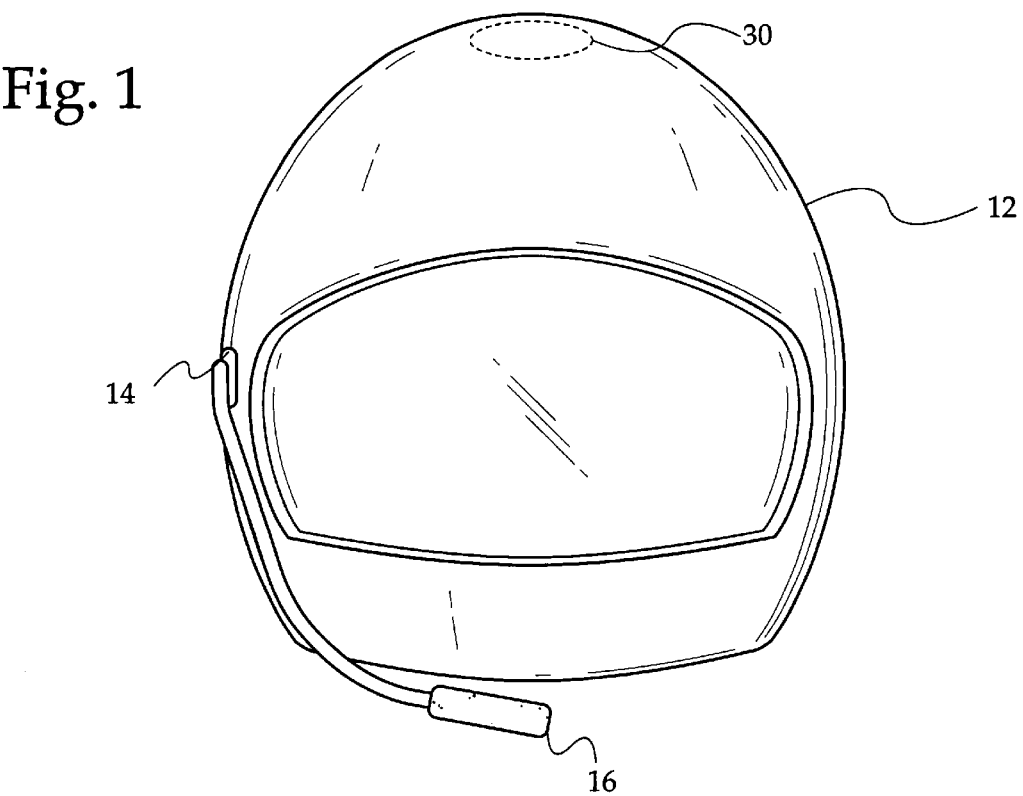
FIG. 1 is a perspective view of the preferred embodiment of the helmet with incorporated communication system constructed in accordance with the principles of the present invention.
Figure 2:
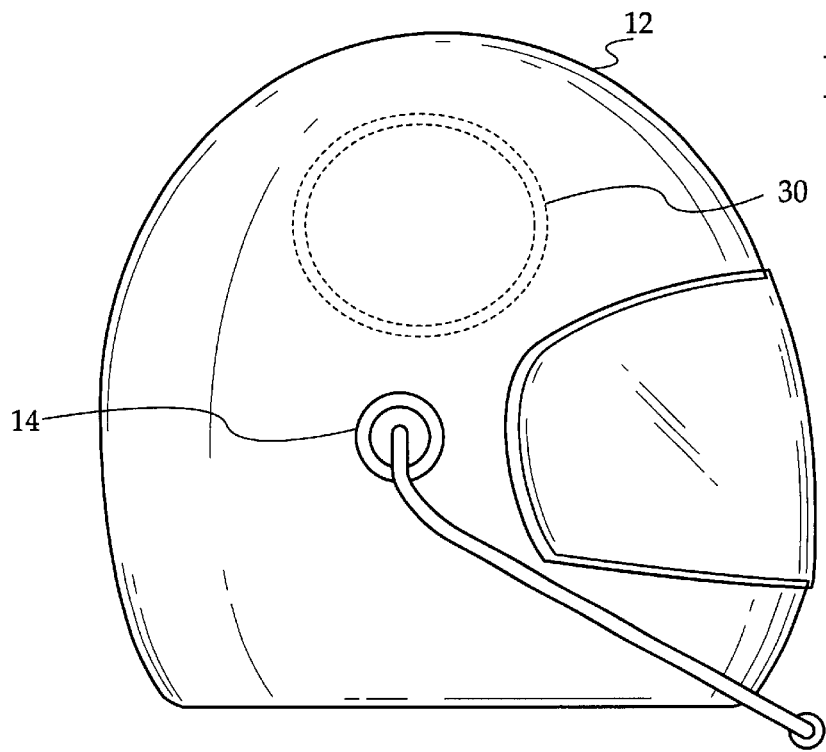
FIG. 2 is a side view of the helmet of the present invention.
Figure 4:
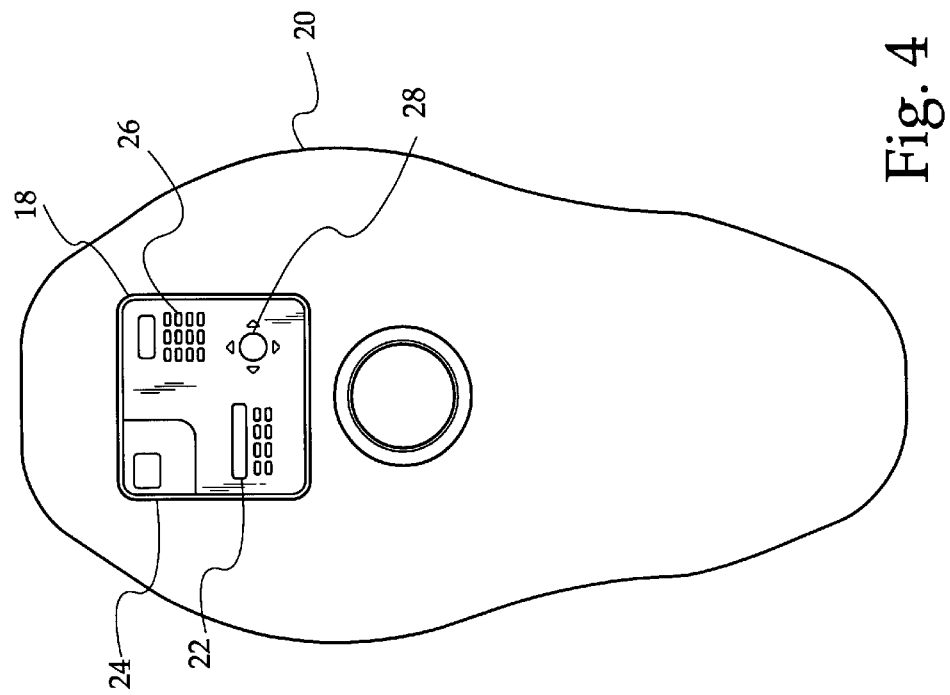
FIG. 4 is a top plan view of the control panel of the present invention.

The control panel 18 is secured to a gasoline tank 20 of a motorcycle. Note FIG. 4. The securement of the control panel 18 to the gasoline tank 20 is merely illustrative of the myriad of possible locations. The control panel 18 is in communication with the communications system of the helmet 12. The control panel 18 can be activated both manually and by voice through the microphone 16 of the helmet 12. The control panel 18 includes a radio 22 with a mini-disk player 24, a cellular telephone 26, and a navigation system 28. These functions can all be operated by voice control merely by speaking predetermined commands through the microphone 16.

The sensor 30 is disposed within the helmet 12. The sensor 30 is capable of sending a distress signal once an impact on the helmet 12 has been sensed. The sensor 30 is in communication with the cellular telephone 26 of the control panel 18 whereby once the impact has been sensed, the distress signal is communicated through the cellular telephone 26. Thus, if the motorcycle is involved in an accident and the motorcyclist falls and the helmet 12 makes contact with a surface, the sensor 30 will cause the cellular telephone 26 to call 911 to alert the proper authorities as to the location of the accident.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A helmet with incorporated communication system for allowing a motorcyclist to safely operate their motorcycle comprising, in combination:

a helmet dimensioned for being positioned on a head of a motorcyclist, the helmet having a communications system incorporated therein comprised of a speaker and a microphone;

a control panel secured to a gasoline tank of a motorcycle, the control panel being in communication with the communications system of the helmet, the control panel being activated both manually and by voice through the microphone of the helmet, the control panel including a radio with a mini-disk player, a cellular telephone, and a navigation system; and a sensor disposed within the helmet, the sensor being capable of sending a distress signal once an impact on the helmet has been sensed, the sensor being in communication with the cellular telephone of the control panel whereby once the impact has been sensed, the distress signal is communicated through the cellular telephone.

2. A helmet with incorporated communication system for allowing a motorcyclist to safely operate their motorcycle comprising, in combination:

a helmet dimensioned for being positioned on a head of a motorcyclist, the helmet having a communications system incorporated therein comprised of a speaker and a microphone;

a control panel secured to a motorcycle, the control panel being in communication with the communications system of the helmet, the control panel including a radio with a mini-disk player, a cellular telephone, and a navigation system; and a sensor disposed within the helmet, the sensor being capable of sending a distress signal once an impact on the helmet has been sensed.

3. The helmet with incorporated communication system as set forth in claim 2, wherein the control panel is activated both manually and by voice through the microphone of the helmet.

4. The helmet with incorporated communication system as set forth in claim 2, wherein the sensor is in communication with the cellular telephone of the control panel whereby once the impact has been sensed, the distress signal is communicated through the cellular telephone.

* * * * *